United States Patent
Do et al.

(10) Patent No.: US 8,883,674 B2
(45) Date of Patent: Nov. 11, 2014

(54) MESOPOROUS ELECTRICALLY CONDUCTIVE METAL OXIDE CATALYST SUPPORTS

(75) Inventors: Thanh Ba Do, Ypsilanti, MI (US); Mei Cai, Bloomfield Hills, MI (US); Martin S. Ruthkosky, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 963 days.

(21) Appl. No.: 12/412,671

(22) Filed: Mar. 27, 2009

(65) Prior Publication Data

US 2009/0312181 A1    Dec. 17, 2009

Related U.S. Application Data

(60) Provisional application No. 61/060,511, filed on Jun. 11, 2008.

(51) Int. Cl.
*B01J 23/20* (2006.01)
*B01J 23/00* (2006.01)
*B01J 37/00* (2006.01)
*B01J 21/06* (2006.01)
*H01M 4/92* (2006.01)
*C01G 23/047* (2006.01)

(52) U.S. Cl.
CPC ........... *C01G 23/047* (2013.01); *B01J 2523/00* (2013.01); *C01P 2006/12* (2013.01); *C01P 2002/52* (2013.01); *C01P 2006/14* (2013.01); *B01J 23/002* (2013.01); *B01J 37/0045* (2013.01); *C01P 2002/72* (2013.01); *C01P 2006/40* (2013.01); *B01J 21/063* (2013.01); *H01M 4/92* (2013.01); *H01M 4/925* (2013.01); *C01P 2004/04* (2013.01); *Y02E 60/50* (2013.01); *C01P 2004/03* (2013.01); *C01P 2006/16* (2013.01)

USPC .......... 502/339; 502/101; 502/350; 423/608; 423/609; 423/610

(58) Field of Classification Search
CPC .... C01G 33/00; C01G 23/047; C01G 23/053; H01M 4/8652; H01M 4/881; H01M 4/9075; H01M 4/92; H01M 4/925; H01M 2008/1095; Y02E 60/50
USPC .................. 423/608–610; 502/101, 339, 350
IPC ....................... B01J 23/00, 23/20; C01G 23/47
See application file for complete search history.

(56) References Cited

U.S. PATENT DOCUMENTS 6,191,067 B1 *  2/2001  Koike et al. ................... 502/350
6,506,510 B1    1/2003  Sioui et al.
(Continued)

OTHER PUBLICATIONS

Zhong et al (Advanced materials, 2000, 12:206-209).*
(Continued)

*Primary Examiner* — Jun Li
(74) *Attorney, Agent, or Firm* — Reising Ethington P.C.

(57) ABSTRACT

A catalyst support material comprising $TiO_2$, and optionally being doped with a transition metal element, and a method for synthesizing the same have been developed. The catalyst support material exhibits an electrical conductivity comparable to widely-used carbon materials. This is because the $TiO_2$ present is primarily arranged in its rutile crystalline phase. Furthermore, a mesoporous morphology provides the catalyst support material with appropriate porosity and surface area properties such that it may be utilized as part of a fuel cell electrode (anode and/or cathode). The $TiO_2$-based catalyst support material may be formed using a template method in which precursor titanium and transition metal alkoxides are hydrolyzed onto the surface of a latex template, dried, and heat treated.

14 Claims, 4 Drawing Sheets

(56) References Cited

U.S. PATENT DOCUMENTS

| | | | |
|---|---|---|---|
| 6,803,077 B2 * | 10/2004 | Yu | 427/376.2 |
| 2002/0143073 A1 * | 10/2002 | Jiang et al. | 516/98 |
| 2003/0064265 A1 * | 4/2003 | Hampden-Smith et al. | 429/30 |
| 2004/0235640 A1 * | 11/2004 | Sterzel | 501/134 |
| 2005/0175774 A1 * | 8/2005 | Exir | 427/226 |
| 2006/0105141 A1 | 5/2006 | Ku et al. | |
| 2006/0188775 A1 | 8/2006 | Mance et al. | |
| 2007/0037041 A1 | 2/2007 | Cai et al. | |
| 2008/0090118 A1 | 4/2008 | Gorobinskiy et al. | |
| 2009/0142640 A1 | 6/2009 | Cai et al. | |

OTHER PUBLICATIONS

Chen et al (Journal of the electrochemical society, 2002, 149:A1092-1099).*
Yoldas (Journal of Materials Science, 1986, 21:1087-1092).*
Abdullah (Aca Materialia 2004, 52: 5151-5156).*
Machine translation of Abe (JP2003-119024), pub date Apr. 23, 2003.*
Written Opinion for application No. PCT/US2009/046044 (4 pages) dated Jan. 18, 2010.
International Search Report for application No. PCT/US2009/046044 (3 pages) dated Jan. 18, 2010.

* cited by examiner

MESOPOROUS ELECTRICALLY CONDUCTIVE METAL OXIDE CATALYST SUPPORTS

CROSS-REFERENCE TO RELATED APPLICATION

This application claims the benefit of U.S. Provisional Application 61/060,511, titled "A Method of Producing Mesoporous and Electrically Conductive Metal Oxides for use in Electrocatalysts" and filed Jun. 11, 2008. The disclosure of that provisional application is incorporated herein by reference.

TECHNICAL FIELD

This invention relates generally to catalyst support materials. More specifically, a mesoporous catalyst support material comprised primarily of rutile crystalline $TiO_2$ has been synthesized. This microstructure provides a catalyst support material with superior electrical conductivity. The electrical conductivity of this material may be, however, further improved by doping it with a transition metal element, such as niobium, in an amount from about 5 mol percent to about 10 mol percent of the titanium. Also, the catalyst support material's mesoporous morphology provides it with desirable surface characteristics appropriate to its broad application. The combination of surface area and electrical conductivity male the catalyst support useful, for example, in fuel cell electrodes.

BACKGROUND OF THE INVENTION

Electrocatalysts are commonly used in PEM fuel cell electrodes to facilitate the oxidation of hydrogen gas at the anode and the reduction of oxygen gas at the cathode. These electrocatalysts commonly comprise nanosized platinum or platinum alloy catalyst particles supported on larger, high-surface area and electrically conductive carbon support particles. The purpose behind such a catalyst support structure is to optimize the amount of three-phase boundary reactive sites per unit area of the electrode so as to minimize catalyst loading requirements and to increase proton mobility through the fuel cell. Indeed, carbon has long been considered a most suitable catalyst support material because of its low cost, good electrical conductivity, high surface area, gas-diffusible friendly morphology, and chemical stability. An example of a specific carbon support material widely used for preparing fuel cell electrocatalysts is carbon black (Vulcan XC-72R).

Unfortunately, fuel cell performance setbacks that occur during vehicle cycling or extended operation, for example, are oftentimes partially attributed to the electrocatalytic oxidation of the carbon support material in the fuel cell's electrodes. This is so because any losses in carbon support material as a result of oxidation is accompanied by an associated loss in catalyst particles which, in turn, reduces the electrode's catalyst capacity. Attempts have thus been made to try and fabricate catalyst support materials that can withstand corrosive fuel cell environments and also provide comparable electrical conductivity and surface area characteristics to those of currently-used carbon materials. For example, $TiO_2$-based materials are being actively investigated. But synthesis methods have not yet been developed that can produce these support materials such that they meet desired fuel cell operating criteria. Some common shortcomings of these current methods are that the synthesized $TiO_2$ support material does not have enough open porosity and it is not easily formed into its more electrically conductive rutile crystalline phase. As a result existing $TiO_2$ support materials display relatively low surface areas and pore volumes as well as high electrical resistivity values. It will be appreciated that the electrically conductive character of the $TiO_2$ support materials is particularly significant for fuel cell applications. But the deficiencies of relatively low surface areas and pore volumes also render current $TiO_2$ supports less desirable for the broad class of applications where support material electrical conductivity is not required.

Thus, a $TiO_2$-based catalyst support material with an acceptable electrical conductivity and surface morphology, and a method for synthesizing the same, are needed.

SUMMARY OF THE INVENTION

A mesoporous catalyst support material comprised primarily of rutile crystalline $TiO_2$ and, optionally, doped, most frequently with a transition metal element, has been synthesized for carrying appropriate fuel cell catalyst particles such as, for example, those of platinum or platinum/transition metal alloys. This material's primary rutile $TiO_2$ crystallographic structure provides it with enhanced electrical resistivity. The resistivity is within two orders of magnitude of the resistivity of the industry-accepted resistivity of carbon support materials commonly employed for fuel cells. Also, its mesoporous morphology ensures that a sufficient porosity and surface area is available so that it can effectively function as part of a catalyst system including as a fuel cell electrode. If doped, the transition metal (M) may be present in an amount from about 5 to about 10 mol percent such that the titanium oxide material has a general formula of $Ti_{1-x}M_xO_y$. In this formula x is from about 0.05 to about 0.10 and y may vary based on the oxidation state of M so as to render the material neutral and stable. This dopant range was chosen because it helps facilitate the direct formation of rutile $TiO_2$ at more moderate temperatures and lower pH values, and also helps improve the electrical conductivity of rutile $TiO_2$ once formed by lowering its band gap energy.

The following discussion will focus on niobium as a doping material. Niobium, in common with other transition metals adopts multiple oxidation states and in the practice of this invention adopts a +5 oxidation state. While such theory is not relied upon, these characteristics are believed to be important in conferring the desired conductivity, suggesting that other transition metals which exhibit a large numbers of oxidation states including a +5 oxidation state, notably vanadium, manganese, iron, molybdenum, tantalum, tungsten and rhenium will also be effective dopants.

The catalyst support material is formed using a template method in which a precursor titanium alkoxide is hydrolyzed from an alcohol suspension and deposited onto the surfaces of decomposable polymer template particles. A doping amount of precursor transition metal alkoxide, such as a niobium alkoxide, may also be hydrolyzed and deposited along with the titanium alkoxide if desired. The coated template particles are then dried, collected, and subjected to at least two heat treatments. These two heat treatments decompose and remove the polymer template particles and also convert the remaining Ti/Nb material into a primarily rutile crystalline $TiO_2$ material.

In an exemplary embodiment of the invention, the decomposable polymer template particles may be of the latex type such as, for example, nanometer scale polystyrene (PS) particles suspended in acidified alcohol. Polystyrene is useful here because it readily decomposes at a relatively low temperature (around 450° C.) and can easily be formed into nanoscale particles sized around a few hundred nanometers or smaller. It also decomposes in a relatively clean manner releasing only hydrogen and hydrocarbon vapors that have minimal reactive effects on the other materials present. Furthermore, the acidified nature of the suspension in which the PS particles are dispersed helps keep the PS particles thoroughly dispersed so as to maximize the available surface area for alkoxide deposition. Also present in the suspension may be one or more surfactants that enhance the template's affinity for precipitate and help facilitate the dispersion of covered particles following deposition.

A titanium precursor alkoxide, and a niobium precursor alkoxide to serve as the transition metal dopant, may then be added to the suspension to introduce $Ti^{4+}$ and $Nb^{5+}$ oxidation state metallic ions thereto. An example of a specific titanium precursor alkoxide that may be used here is titanium tetraisopropoxide, also referred to as TTIP, $[Ti(O(CH_3)CHCH_3)_4]$. But of course other titanium alkoxides, such as titanium tetraethoxide and titanium tetra-n-butoxide, may be used as well. An example of a specific niobium precursor alkoxide that may be used here is niobium pentaethoxide $[Nb(OC_2H_5)_5]$. The titanium and niobium alkoxides may be added in quantities that the result in the synthesized catalyst support material being doped with niobium in an amount from about 5 mole percent to about 10 mole percent. Furthermore, the TTIP and niobium pentaethoxide may be added to the suspension so that, in addition to the dopant mole ratio just mentioned, the weight ratio of PS to later formed oxides (both of Ti and Nb) will be between 0.1 to 0.3.

The alkoxides, when added to the suspension, readily hydrolyze to form hydrated titanium and niobium oxides when exposed to the water present in the PS suspension. Upon formation, these hydrated oxides precipitate out of solution as a white gel and deposit onto the surface of the PS nanoparticles—thus mimicking a core-shell structure in which the Ti and Nb hydrated oxides coat the PS particles to a thickness of up to about a few tens of nanometers. The suspension may then be injected into a spray-dryer or subjected to another appropriate technique in order to disperse, dry, and collect the coated PS particles. Such a procedure generally allows for a significant portion of the PS particles to be collected as a very fine white powder.

The collected white powder may then be subjected to a first heat treatment so as to achieve at least two objectives. First, this heating dehydrates the hydrated titanium and niobium oxides to form substantially amorphous anhydrous titanium and niobium oxides. This heating also forms, however, a modest amount of $TiO_2$ directly into its rutile crystalline microstructure phase. It is believed that such a transformation is assisted by the small amount of niobium present in the $TiO_2$ lattice system. In particular the niobium seems to function in a catalytic manner by sufficiently lowering the activation energy for the formation of rutile $TiO_2$ at relatively low temperatures and less acidic environments that normally favor exclusive anatase $TiO_2$ formation. Second, this heating decomposes and volatizes the PS particles thus separating the template particles from their overlying or shell-like $TiO_2$-based coatings. The rate of decomposition of the PS particles at this juncture influences the porosity of the remaining niobium-doped $TiO_2$-based nanomaterial and ultimately provides it with a mesoporous morphology; that is, a material comprising pore diameters in the range of about two nanometers to about fifty nanometers.

In this configuration the partially-crystalline mesophase constitutes an efficient and effective catalyst substrate.

For even broader utility of the mesophase substrate a second, higher-temperature heat treatment may now be carried out to promote further conversion of the $TiO_2$ into its rutile crystalline phase while also reducing some $TiO_2$ into lower oxidation state titanium oxides. These lower oxidation state titanium oxides, such as $Ti_4O_7$, have more free active electrons available for transport through a crystalline structure and thus help improve the electrical conductivity of the catalyst support material rendering it more suitable as a support material in highly acidic fuel cell environments.

While these mesoporous rutile $TiO_2$ materials were devised for PEM fuel cell applications they may be used in other catalyst applications where their porosity, specific surface area, and low electrical resistivity may be utilized.

DESCRIPTION OF PREFERRED EMBODIMENTS

In this section, attention will be focused on the specific processing of a mesoporous catalyst support material comprised primarily of rutile crystalline $TiO_2$ with enhanced electrical conductivity with particular application for fuel cells. This specific high conductivity catalyst support material often requires two thermal treatments, the second of which is used to increase the conductivity of the support. Thus this support may, after only the initial thermal treatment, be employed as a catalyst support where the enhanced electrical conductivity imparted by the second thermal treatment is not required.

Fuel cells—such as PEM fuel cells—have generally been outfitted with electrocatalyst-containing electrode layers that include finely divided carbon powders as a catalyst support material. But the highly acidic and otherwise corrosive nature of fuel cells often degrades these carbon materials; incidents that can disturb optimal fuel cell operating conditions and lead to, among others, efficiency losses. Catalyst support materials having $TiO_2$ as their main constituent, on the other hand, are more corrosion resistant than typical carbon powders. But these materials are not quite as electrically conductive as carbon and have proven difficult to synthesize with a morphology (surface characteristics) that meets the minimal desired criteria associated with fuel cell electrode applications. To address these and other related issues, a synthesis technique has been developed that can fabricate a $TiO_2$-based catalyst support material that exhibits a mesoporous morphology and an electrical conductivity comparable to that of its carbon counterpart. This material can thus help improve the service life of fuel cell electrodes as well as the efficiency of the fuel cell.

Figure 1:
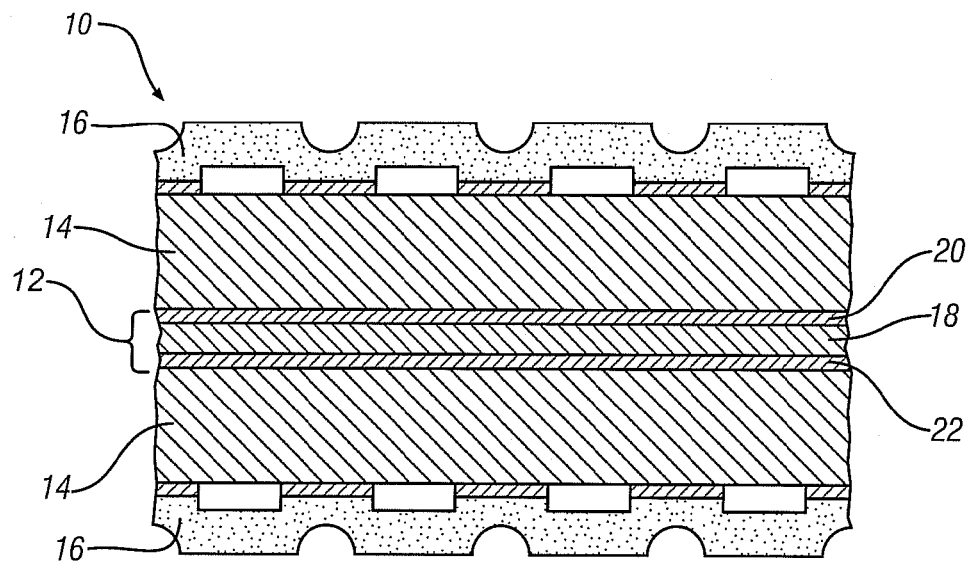
FIG. 1 is a cross-sectional view of a PEM fuel cell having an anode layer and a cathode layer that may comprise the catalyst support material of this invention.

FIG. 1 shows, in a simple illustrative manner, a PEM fuel cell 10 that may be combined in series with many other fuel cells of similar construction to form a fuel cell stack (not shown) capable of generating a relatively high power density. The fuel cell 10 shown here includes a membrane electrode assembly (MEA) 12 sandwiched between opposed gas diffusion media (GDM) layers 14, and a bipolar plate 16 disposed adjacent to each GDM layer 14 opposite the MEA 12. The construction and operation of such a fuel cell 10 and its individual components is generally well understood by skilled artisans and, thus, need not be fully explained here.

The MEA 12 is primarily composed of three components or layers—namely, a solid polyelectrolyte membrane 18, an anode 20, and a cathode 22. The polyelectrolyte membrane 18 is an ionically conductive and electrically insulative polymer material that serves several purposes. For instance, it allows protons generated at anode 20 to migrate towards the cathode 22 through its polymer matrix; it forces electrons generated at the anode 20 to travel through an external circuit to reach the cathode 22; and it keeps the reactant gasses supplied to each electrode separated. And there are many polyelectrolyte materials available for such a purpose. For example, the MEA 12 may utilize a membrane formed of one or more sulphonated fluoropolymers such as the perfluorosulfonic acid copolymer available from DuPont under the trade designation NAFION®. But of course the polyelectrolyte membrane 18 may be formed from other known proton conductive materials.

The anode 20 and the cathode 22 are in intimate contact with opposite sides of the polyelectrolyte membrane 18. The anode 20 dissociates reactant gasses, such as hydrogen, into protons and electrons while the cathode 22 facilitates the reaction of those protons and electrons on the other side of the membrane 18 with supplied oxygen to form water. To perform these tasks, both the anode 20 and the cathode 22 generally comprise electrocatalysts integrated within a structural binder material of, for example, a polyelectrolyte material. The electrocatalyst utilized here comprises catalyst particles carried on a catalyst support material comprised primarily of $TiO_2$ and doped, if desired, with a transition metal element such as niobium, vanadium, manganese, iron, molybdenum, tantalum, tungsten and rhenium in an amount from about 5 mole percent to about 10 mole percent.

The catalyst support material, if doped, may thus be represented by the formula $Ti_{1-x}M_xO_y$ with M being a transition metal element, with x ranging from about 0.05 to about 0.10, and with y being variable depending on the oxidation state of the transition metal. The $TiO_2$ of this material is primarily arranged in its rutile crystalline microstructure thus providing the material with enhanced electrical conductivity as compared to its non-conductive anatase phase. The $TiO_2$ catalyst support material also exhibits a mesoporous morphology and can thus achieve acceptable surface area and porosity characteristics so as to ensure that a large concentration of three-phase boundary reaction sites are available for reactant/catalyst particle interaction. As has been noted previously, in this form the support is suitable for application as a catalyst support where the enhanced electrical conductivity imparted by subsequent processing is not a requirement. Examples of catalyst particles that can be supported on such a support material include, but are not limited to, platinum, palladium, and platinum alloys such as those containing molybdenum, cobalt, ruthenium, nickel, tin, or other suitable transition metals.

Figure 2:
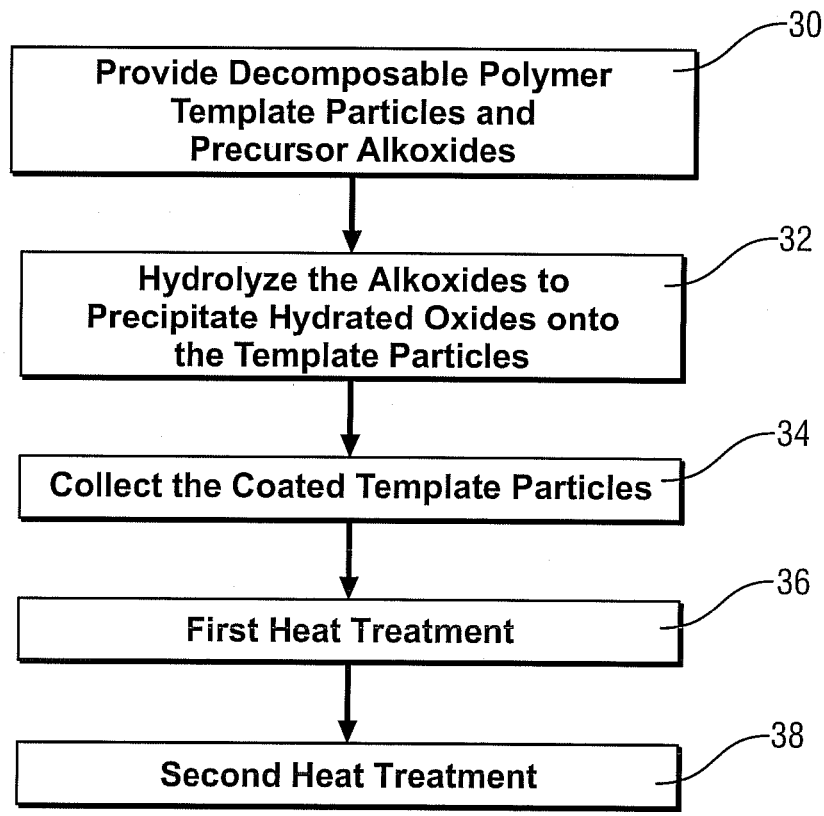
FIG. 2 is flowchart diagramming some of the steps for synthesizing the catalyst support material of this invention.

A synthesis technique for forming the catalyst support material just described and being doped with niobium is shown schematically in FIG. 2. First, as depicted in step 30, there is provided decomposable polymer template particles, an amount of a titanium precursor alkoxide, and a doping amount of a niobium precursor alkoxide. The polymer template particles may be spherical polystyrene (PS) particles sized around 200 nanometers in diameter. These are obtained as a 10 weight percent dispersion in water. Adding the appropriate mass of PS particles to anhydrous ethanol acidified with 3-4 drops of 5N nitric acid so that it exhibits a pH around 3 necessarily also adds water to produce a dispersion of PS in an acidified ethanol—water solution. The quantity of water added will vary depending on the mass of polystyrene particles added, ranging from 0.58 to 0.97 moles, and thus as Table 1 makes clear, in all cases the water is present in molar excess. Other polymeric materials of the appropriate size distribution may be suitable as well. The acidified environment was solution of spherical nanosized PS solution. The role of the titanium and niobium precursor alkoxides utilized here is to make available to the template a supply of $Ti^{4+}$ and $Nb^{5+}$ oxidation state metallic ions, respectively. Specific examples of suitable precursor alkoxides include, but are not limited, to titanium tetraisopropoxide [$Ti(O(CH_3)CHCH_3)_4$)] and niobium pentaethoxide [$Nb(OC_2H_5)_5$]. The precursor alkoxides and the PS template particles may be provided in quantities that satisfy two conditions: (1.) the synthesized catalyst support material is doped with niobium in an amount from about 5 mole percent to about 10 mole percent of the titanium; and (2.) the weight ratio of PS particles to formed oxides (of Ti and Nb) is between about 0.1 and about 0.3.

Next, in step 32, the precursor alkoxides are hydrolyzed into hydrated titanium and niobium oxides. A general representation of this reaction can be summarized by the following equations.

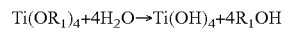

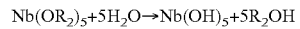

These hydrated oxides readily precipitate out of solution as a white gel and deposit onto the surface of the PS template nanoparticles. The result is a core-shell structure in which the "core" PS nanoparticles are coated with a hydrated oxide "shell" that has a thickness of about a few nanometers to about a few tens of nanometers. Normally the amount of water present in the PS template suspension is sufficient to complete the hydrolysis of both precursor alkoxides. Also, the presence of a surfactant in the suspension at about one weight percent of the PS particles may help enhance the deposition of the oxides onto the PS template particles at this stage. Suitable surfactants include hexadecyl-trimethylammoniumbromide (HATB) or any other macromolecule with a hydrophobic hydrocarbon tail and a hydrophilic head that can decompose without contaminating the suspension.

The coated template PS nanoparticles may now be collected as depicted in step 34. A spray dryer, for instance, may be employed to disperse, dry, and collect a significant portion (greater than 90%) of the coated template PS particles by spraying the suspension at a high nozzle temperature for evaporation of the alcohol and water under an inert blanket gas of nitrogen. Nozzle temperatures of about 100° C. to about 120° C. generally suffice. A very fine white powder is the result of such a process.

The collected white powder may now be subjected to a first heat treatment as shown in step 36. This heat treatment is performed in an inert atmosphere at a temperature and duration so as to accomplish at least two objectives. First, the hydrated oxide shell is dehydrated and substantially converted into an amorphous anhydrous $TiO_2$ and niobium oxide shell, i.e., a $Ti_{1-x}Nb_xO_y$ shell with $0.05 \leq x \leq 0.10$ and y being variable. But, nonetheless, it has been found that this heat treatment step 36 directly produces a modest amount of the $TiO_2$ in its rutile crystalline structure due to the catalytic effects of niobium. More specifically, and without being bound by any theory, it is thought that the presence of niobium lowers the activation energy of the rutile $TiO_2$ reaction pathway enough such that some rutile $TiO_2$ is formed instead of the generally more energetically favorable anatase $TiO_2$. Second, the template PS nanoparticles are decomposed and volatized while the newly formed $Ti_{1-x}Nb_xO_y$ shell is further dried. The volatile compounds formed from PS template degradation—namely hydrogen and hydrocarbon vapors—burst through the $Ti_{1-x}Nb_xO_y$ shell and are swept away to provide the remaining oxide shell material with a variety of pore types and an overall mesoporous morphology and an average pore size of about 15 nm.

In particular, at least three types of pores have been identified in the oxide material; the presence and appearance of which are dependent on the rate of template PS decomposition. They include—in order from those formed by a relatively rapid decomposition to a relatively slow decomposition—widely open pores, ink-pot open pores, and closed pores. These two objectives can be accomplished at temperatures around 500° C.

Then, as delineated in step 38, the material may be subjected to a second heat treatment. This heat treatment may be carried out in a 100% hydrogen atmosphere at a temperature and duration capable of providing energy to promote the further arrangement of anatase $TiO_2$ into its more electrically conductive rutile crystalline phase. The hydrogen gas, in conjunction with this higher temperature, also serves to reduce some of the $TiO_2$ into lower oxidation state titanium oxides that have more free active electrons available for transport through a crystal structure. As such, one result of this second heat treatment 38 is an improved electrical conductivity of the $Ti_{1-x}Nb_xO_y$ material formed during heat treatment step 36. Another notable result of the second heat treatment 38 is that the porosity and surface area of the $Ti_{1-x}Nb_xO_y$ material is enhanced due to contraction and shriveling of this material under these relatively high temperatures. While the specific temperature employed here is likely to be higher than that used in heat treatment step 36, it is not as high as would normally be required to fully convert $TiO_2$ from its anatase state to its crystalline rutile state. This is so because the direct formation of rutile $TiO_2$ during heat treatment step 36 helps minimize the energy demands, and thus the temperature needed to meet those demands, of heat treatment step 38. An appropriate temperature for this heat treatment may be around 850° C.

The synthesized catalyst support material may now be loaded with a suitable catalyst and incorporated into a fuel cell electrode by known techniques.

The synthesis technique of FIG. 2 will now be described by way of the following specific and non-limiting examples.

EXAMPLE

Nano-polystyrene (PS) particles measuring about 200 nm in diameter, and their associated water dispersant, were thoroughly dispersed at slightly different amounts into three sample solutions of 105 mL of anhydrous ethanol, 5N nitric acid ($HNO_3$), and hexadecyl-trimethylammoniumbromide (HATB). The amount of PS particles added to each sample solution was varied so that the three suspensions would have a different weight ratio of polystyrene particles to the product oxides (both Ti and Nb) which are deposited on the polystyrene particles. Those weight ratios were 0.15, 0.20, and 0.25. The nitric acid was added to each sample to lower its pH to around 3, and the HATB was added to each sample in an amount equal to about one weight percent of the PS particles. The resulting suspensions were then stirred vigorously for about 30 minutes.

Next, solutions containing 0.025 moles of titanium tetraisopropoxide and 0.002 moles of niobium pentaethoxide (corresponding to about 8 mol % doping) were prepared for addition to each of the sample suspensions. These solutions were prepared by dissolving 7 mL of stock 100% titanium tetraisopropoxide and 0.5 mL of stock 100% niobium pentaethoxide into 100 mL of anhydrous ethanol. They were then added drop-wise with a peristaltic pump to each of the acidified ethanol-PS suspensions and stirred with a magnetic stirrer over the course of about two hours. The initial addition rate was approximately 1 mL/minute and gradually increased to about 2-2.5 mL/min as the reaction proceeded. The stirring rate of the sample suspensions was also slightly increased over the course of solution addition as rate of 300 RPM was used for the first thirty minutes, a rate of 350 RPM was used for the next sixty minutes, and a rate of 400 RPM was used for the final thirty minutes. The stirring of the sample suspensions was continued for another thirty minutes at 400 RPM after the titanium tetraisopropoxide and niobium pentethoxide solutions were fully added to the sample suspensions. A summary of what has been added to each sample up to this point is summarized in Table 1 below.

TABLE 1

| SAMPLE | Moles of Titanium tetraiso-propoxide | Moles of Niobium penta-ethoxide | Mass/Moles of Ethanol | HAT B | Mass of Nano-polystyrene particles | Moles of Water (added in conjunction with PS particles) |
|---|---|---|---|---|---|---|
| 1 | 0.025 | 0.0020 | 205 mL/ 3.50 mol | 1.0 wt. % of PS | 1.936 gm | 0.968 |
| 2 | 0.025 | 0.0020 | 205 mL/ 3.50 mol | 1.0 wt. % of PS | 1.548 gm | 0.774 |
| 3 | 0.025 | 0.0020 | 205 mL/ 3.50 mol | 1.0 wt. % of PS | 1.161 gm | 0.581 |

Each sample was then injected into BUCHI B-290 mini spray dryer to disperse, dry, and collect the coated template particles. The nozzle temperature of the spray dryer was set at 120° C. and nitrogen was used as a blanket gas. The spray drying process provided a collection efficiency of over 90% and produced a very fine white powder in each case.

Figure 3:
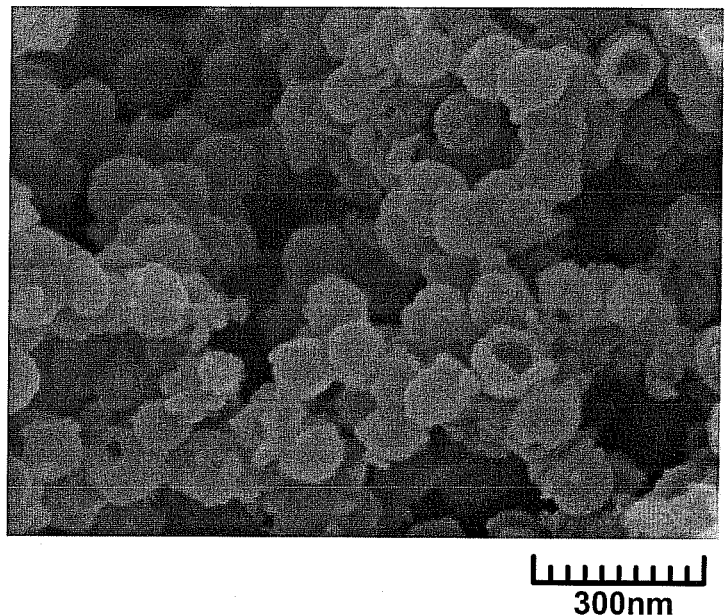
FIG. 3 is a transmission electron microscopy image showing the mesoporous morphology of the catalyst support material after the first heat treatment but before the second heat treatment of the synthesis procedure diagramed in FIG. 2.
Figure 4:
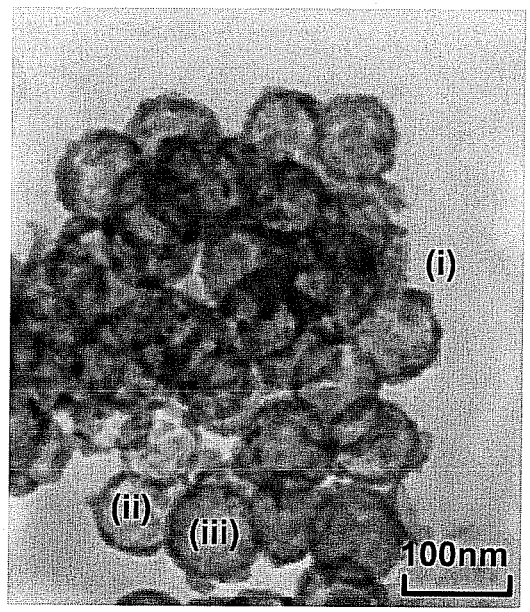
FIG. 4 is a transmission electron microscopy image showing the presence of three pore types in the catalyst support material shown in FIG. 3.
Figure 5:
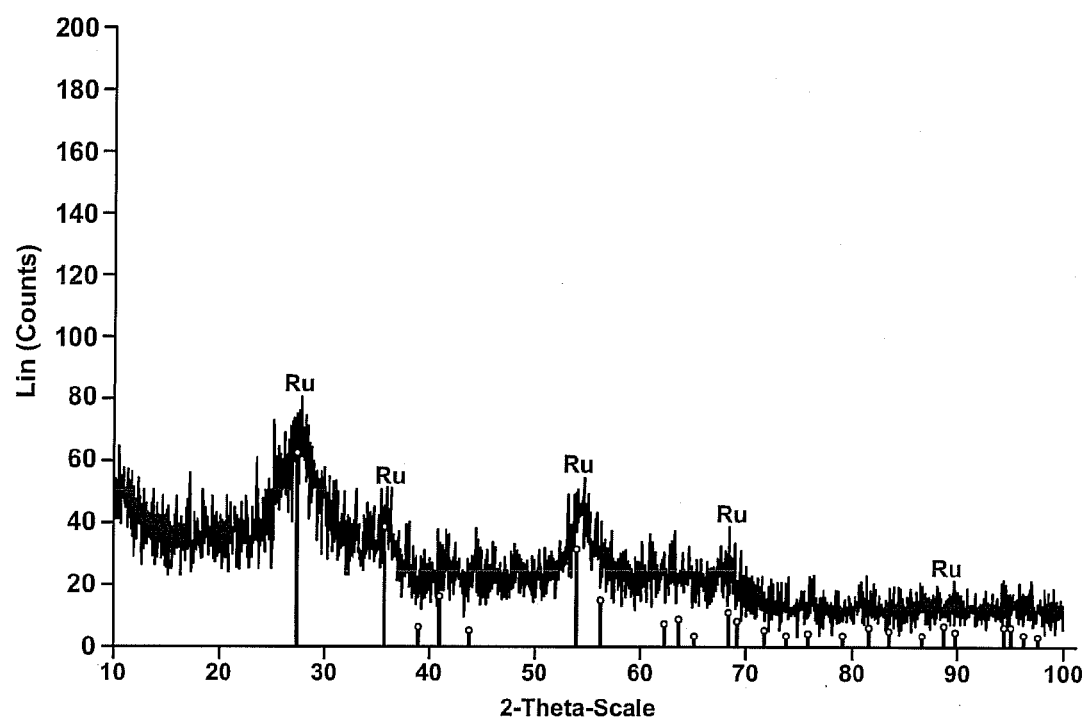
FIG. 5 is an X-ray diffraction diagram showing the appearance of the $TiO_2$ rutile crystalline phase after the first heat treatment of the synthesis procedure diagramed in FIG. 2.

The white powder of each sample was then subjected to a first heat treatment at 500° C. in an argon atmosphere to remove the template and convert the Ti and Nb hydrated oxides into Ti and Nb anhydrous oxides. An inert gas stream was employed to sweep away the volatile compounds produced during decomposition of the template PS particles. The resulting material can now be said to have the general formula $Ti_{0.92}Nb_{0.08}O_{2.04}$ due to the presence of $TiO_2$ and $Nb_2O_5$, and its mesoporous morphology can be seen in the TEM image of FIG. 3. FIG. 4 likewise shows a TEM image identifying the three types of pores exhibited by the material that help it achieve this morphology. As can be seen, (i.) widely open pores, (ii.) ink-pot open pores, and (iii.) closed pores are all present. Furthermore an X-ray diffraction diagram of the material, which is shown in FIG. 5, confirms that the $TiO_2$ present is at least partly configured in its crystalline rutile phase. Such a conclusion can be drawn from the appearance of specific rutile peaks at 27°, 36°, and 54° 2-theta. FIGS. 3, 4, and 5 are representative of what each sample has produced up to this point.

Figure 6:
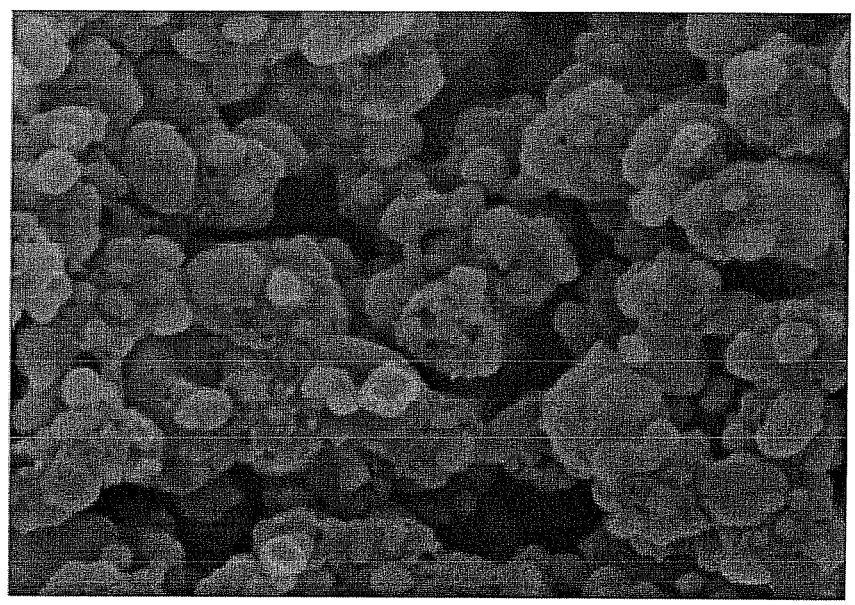
FIG. 6 is a transmission electron microscopy image showing the porous morphology of the catalyst support material after the second heat treatment, but before catalyst loading, of the synthesis procedure diagrammed in FIG. 2.
Figure 7:
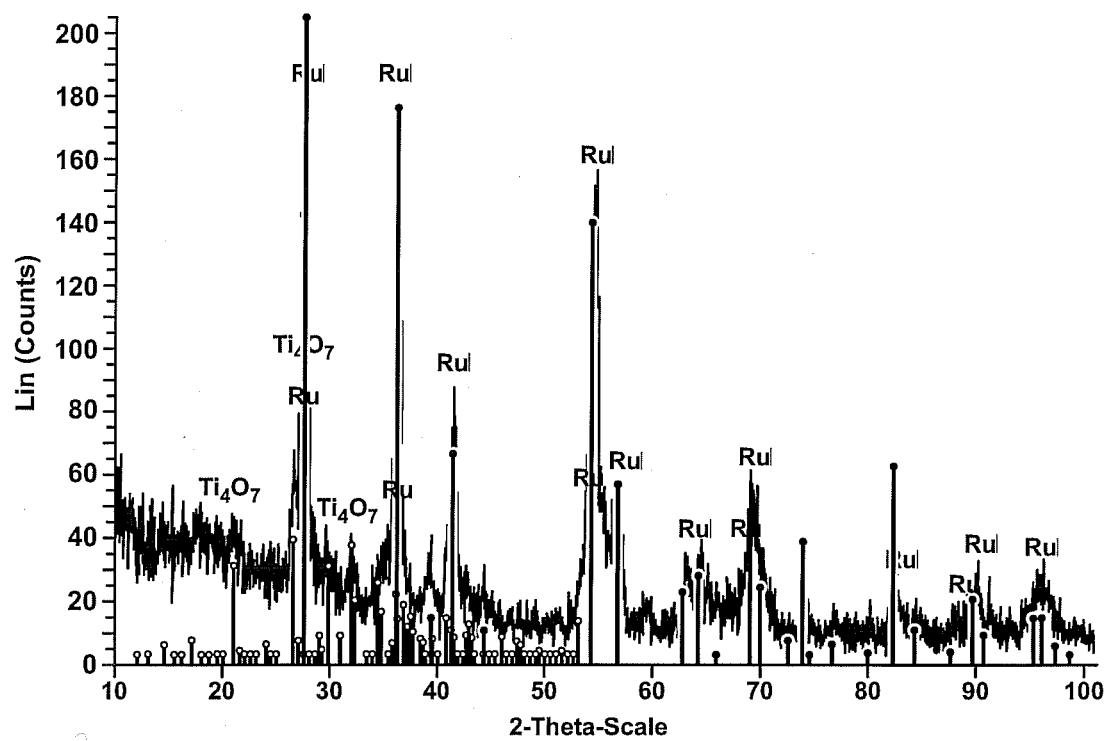
FIG. 7 is an X-ray diffraction diagram showing the titanium oxides present, including those of the rutile $TiO_2$ phase and the lower oxidation state $Ti_4O_7$, after the second heat treatment of the synthesis procedure diagrammed in FIG. 2.

After the first heat treatment, the material of each sample was subjected to a second heat treatment at 850° C. in a hydrogen atmosphere to promote further $TiO_2$ arrangement into its rutile phase while partially reducing some $TiO_2$ into lower oxidation state titanium oxides. FIG. 6 shows a TEM image of the mesoporous material after this second heat treatment. And FIG. 7 shows an X-ray diffraction diagram of the same material along with peak identifiers at those specific peaks associated with the $TiO_2$ rutile phase and the lower oxidation state $Ti_4O_7$ oxide material. FIGS. 6 and 7 are representative of what each sample has produced up to this point. As such, it can be seen that the $Ti_{0.92}Nb_{0.08}O_{2.04}$ material that emerges from this second heat treatment has a mesophorous morphology and is primarily comprised of rutile crystalline $TiO_2$.

The morphology and the electrical conductivity of the synthesized catalyst support material from each sample are summarized below in Tables 2 and 3, where the sample designations correspond with those associated with the reactant listing in Table 1.

TABLE 2

| SAMPLE | Ratio of nano-Polystyrene mass to resulting oxide mass | Resistivity (Ω-cm) |
|---|---|---|
| 1 | 0.15 | 6.4 |
| 2 | 0.20 | 9.3 |
| 3 | 0.25 | 14.6 |

TABLE 3

| SAMPLE | Ratio of nano-Polystyrene mass to resulting oxide mass | BET Surface Area (m²/g) | Porosity (cm³/g) | Average Pore Size (Angstroms) |
|---|---|---|---|---|
| 1 | 0.15 | 75 | 0.14 | 151 |
| 2 | 0.20 | 107 | 0.21 | 159 |
| 3 | 0.25 | 116 | 0.22 | 159 |

The data compiled in Tables 3 and 4 suggests that the synthesized $TiO_2$-based materials would be an effective catalyst support material for a PEM fuel cell. For instance, the material synthesized in each sample exhibits an electrical conductivity within two orders of magnitude of common catalyst support carbon powder—which was measured at 0.22 Ω-cm. The surface area and porosity characteristics observed for each sample are also comparable to traditional carbon support materials.

The above description of embodiments of the invention is merely exemplary in nature and, thus, variations thereof are not to be regarded as a departure from the spirit and scope of the invention.

The invention claimed is:

1. A method of synthesizing a mesoporous catalyst support material comprising $TiO_2$, the method comprising:
   providing decomposable nanometer scale polymer template particles having particle surfaces and being suspended with stirring in an acidified liquid alcohol medium;
   adding a titanium precursor alkoxide to the medium;
   hydrolyzing the precursor alkoxide to deposit hydrated titanium oxide onto the surfaces of the polymer template particles suspended in the liquid alcohol medium;
   collecting the polymer template particles with hydrated titanium oxide deposited thereon;
   heating the polymer template particles with deposited hydrated titanium oxide to decompose and volatilize the polymer particles and dehydrate the hydrated titanium oxide into a particulate mesoporous catalyst support material of substantially anhydrous $TiO_2$ with at least some of the $TiO_2$ being converted into its rutile crystal phase, the $TiO_2$ support material having open mesopores and closed mesopores, the ratio of the mass of polymer template particles and formed $TiO_2$ being between 0.1 and 0.3.

2. The method of claim 1 wherein the $TiO_2$ is doped with a transition metal having a valence of +5, the method comprising adding a transition metal precursor alkoxide and the titanium precursor alkoxide to the acidified alcohol medium and hydrolyzing the precursor alkoxides to deposit hydrated titanium oxide doped with between about 5 and 10 mol percent of hydrated transition metal oxide onto the surfaces of nanometer scale polymer template particles.

3. The method of claim 2 in which the transition metal is niobium.

4. The method of claim 1 wherein providing the decomposable polymer template particles comprises providing an acidified suspension of polystyrene nanoparticles in an alcohol-water solution, the polystyrene nanoparticles being spherical in shape and around 200 nanometers in diameter.

5. The method of claim 1, wherein the polymer template particles are heated at a temperature of about 500° C. or higher to decompose them.

6. The method of claim 1 in which the synthesized mesoporous catalyst material has pore diameters in the range of about two nanometers to about fifty nanometers.

7. A method of synthesizing a mesoporous and electrically conductive catalyst support material comprising $TiO_2$ doped with niobium for use in a PEM fuel cell electrode, the method comprising:
   providing decomposable nanometer scale polystyrene polymer template particles having particle surfaces and being suspended with stirring in an acidified liquid alcohol and water medium;
   adding a titanium precursor alkoxide and a niobium precursor alkoxide to the medium;
   hydrolyzing the alkoxides to deposit hydrated titanium oxide doped with between about 5 and 10 mol percent of niobium oxide onto the surfaces of the polystyrene polymer template particles suspended in the liquid alcohol and water medium;

collecting the polystyrene polymer template particles with hydrated titanium oxide and niobium oxide deposited thereon;

heating the polymer template particles with deposited hydrated titanium oxide and niobium oxide to decompose and volatilize the polystyrene polymer particles and dehydrate the hydrated titanium and niobium oxide into a mesoporous and electrically conductive particulate catalyst support material of substantially anhydrous $TiO_2$ doped with a niobium oxide, with at least some of the $TiO_2$ being converted into its rutile crystal phase and some of the $TiO_2$ being converted into its anatase phase, the catalyst support material having open mesopores and closed mesopores; and heating the $TiO_2$ and niobium oxide to further convert at least some of the $TiO_2$ from its anatase phase to its rutile phase and to produce lower oxidation state titanium oxides, the ratio of the mass of polystyrene template particles and formed $TiO_2$ being between 0.1 and 0.3.

8. The method of claim 7, comprising providing an acidified suspension of polystyrene nanoparticles in an ethanol-water solution, the polystyrene nanoparticles being spherical in shape and around 200 nanometers in diameter.

9. The method of claim 8, wherein providing an acidified suspension of polystyrene nanoparticles further comprises providing the suspension with a surfactant.

10. The method of claim 7, wherein the polymer template particles are heated at a temperature of about 500° C. or higher to decompose them.

11. The method of claim 7, wherein heating the $TiO_2$ and niobium oxide comprises heating at about 850° C.

12. The method of claim 7, wherein providing an amount of titanium and niobium alkoxides comprises providing titanium tetraisopropoxide and niobium pentaethoxide.

13. The method of claim 7, wherein collecting the template comprises spray drying the template.

14. The method of claim 7 in which the synthesized mesoporous catalyst material has pore diameters in the range of about two nanometers to about fifty nanometers.

\* \* \* \* \*